J. J. ENSLEY.
Making Wood Gas.
No. 57,491.
Patented Aug. 28, 1866.
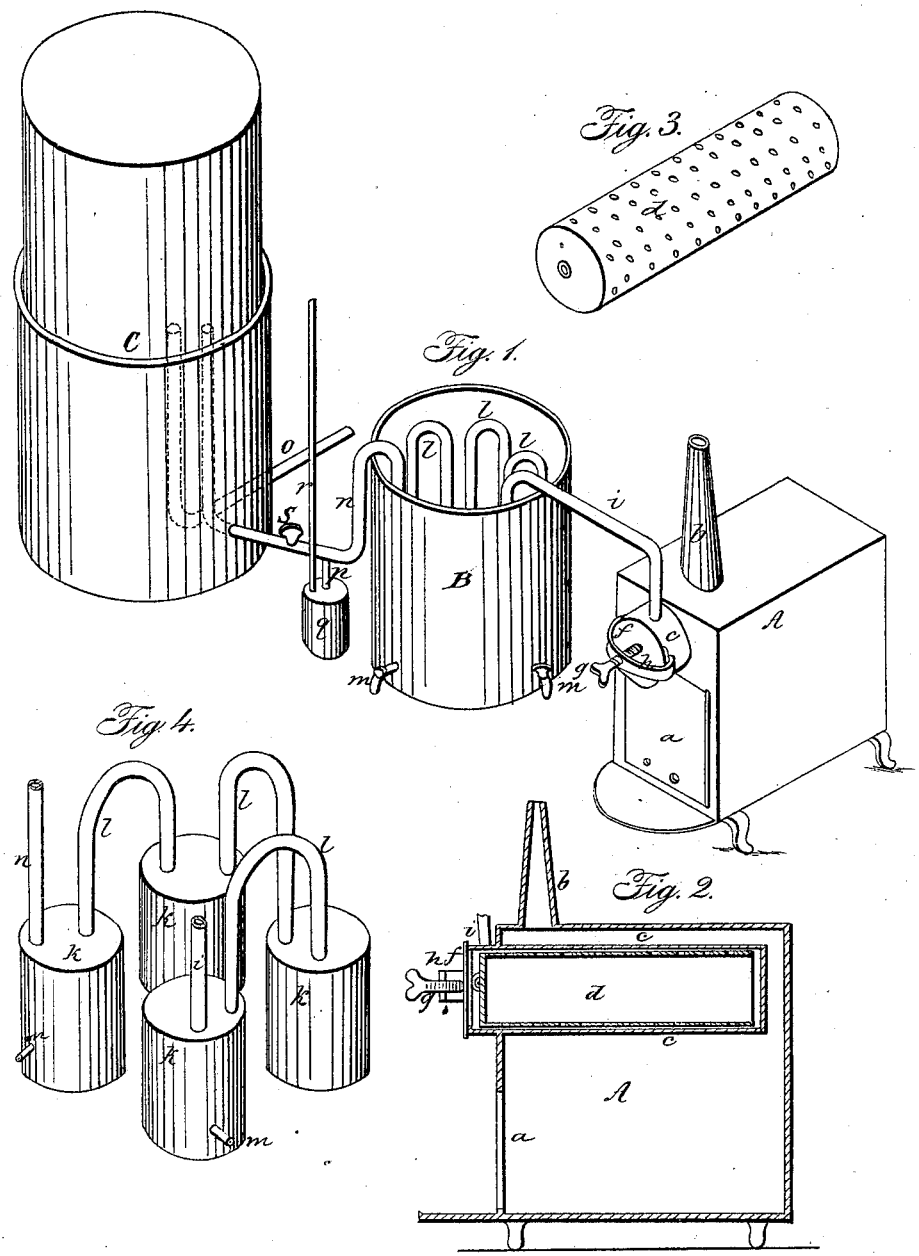
Witnesses:
R P Osgood.
J. A. Davis
Inventor:
J J Ensley
By J Fraser &co
Attys

UNITED STATES PATENT OFFICE.

J. J. ENSLEY, OF NEW YORK, N. Y.

IMPROVED APPARATUS FOR GENERATING GAS.

Specification forming part of Letters Patent No. 57,491, dated August 28, 1866.

*To all whom it may concern:*

Be it known that I, J. J. ENSLEY, of the city, county, and State of New York, have invented certain new and useful Improvements in Apparatus for Making Gas from Animal and Vegetable Substances and Producing Bone-Black, &c.; and I do hereby declare that the following is a full and exact description thereof, reference being had to the accompanying drawings, making part of this specification.

Figure 1 is a perspective view of my improved apparatus; Fig. 2, a longitudinal vertical section of the retort; Fig. 3, perspective view of one of the removable charging-cylinders; Fig. 4, perspective view of the purifying-chambers.

Like letters of reference indicate corresponding parts in all the figures.

It is the object of my invention to separate the gaseous and solid constituents of animal and vegetable substances, retaining the gaseous matter in a suitable apparatus, so as to be utilized, and producing bone-black or other valuable residuum from the solid.

As represented in the drawings, A is a retort having a fire-chamber, $a$, and smoke-pipe $b$, as usual. Within this is situated a chamber, $c$, closed except at the outer end. In this chamber fits any one of a set of cylinders, $d$, made open at the inner end to receive the charge of animal or vegetable matter to be subjected to heat. When one of these cylinders is in place in the chamber $c$ the latter is closed by a cover, $f$, fitting in its mouth and held in place by a pressure-screw, $g$, resting in a removable bearing, $h$, or by some equivalent arrangement. In this manner the roasting-chamber is made gas-tight.

From the chamber $c$, at a suitable position, a pipe, $i$, extends to one of a series of condensing-chambers, $k\ k\ k$, resting in a water-tank, B. These chambers are connected by short pipes, $b\ b\ b$, so as to give a free communication through all of them. They each have, also, cocks $m\ m$, extending out through the sides of the water-tank to allow the escape of condensed water.

A pipe, $n$, extends from the final condensing-chamber and passes into a gasometer, C, of usual construction, from which there is exit by a distributing-pipe, $o$. With the lowest portion of pipe $n$ connects a short tube, $p$, opening into a tight barrel, $q$. From this barrel a pipe, $r$, connects with a suitable pump. The pipe $n$ is also provided with a stop-cock, $s$, by which the flow through the pipes may be cut off and the contents of the gasometer retained.

The operation of the apparatus above described will be readily understood. The animal or vegetable matter to be treated is placed in one of the perforated cylinders $d$, which is inserted in the chamber $c$ with the open end forward. The chamber is then closed by the cover and screw $f\ g$, and heat is applied. As fast as the gaseous matter is evolved it passes through the perforations of the cylinder and through the pipe $i$ into the condensing-chambers $k\ k\ k$. There, having a full circulation through all the chambers by the pipes $b\ b\ b$, and being surrounded by water in the tank B, the watery matter is condensed, and is drawn off through the cocks $m\ m$. From the chambers the gas is conveyed to the gasometer C, whence it is distributed.

In the employment of this apparatus I have two objects in view: First, to produce bone-black or other valuable residuum from the solid elements of the substance acted on; and, second, to retain and utilize the gaseous matter that is evolved. In ordinary apparatus for producing bone-black the gaseous matter is driven off as worthless. I retain all the gaseous elements and purify the same, and am enabled to mix them where it is desirable to produce a compound gas—such, for instance, for illuminating. In this case I can produce the mixture by simply first placing vegetable substance in the retort to produce the requisite hydrogen, and then animal matter to produce the carbon. Three parts of vegetable to one of animal matter will produce the proper proportions.

The apparatus is very effective for producing bone-black; also for charring wood and retaining the essential principles. It is applicable whenever it is desirable to treat either vegetable or animal matter to separate the gaseous or liquid qualities from the solid.

In order to facilitate the operation I employ a series of the cylinders $d$, which enables me to insert one in place as soon as another is removed, whereby there is no unnecessary loss of the gas already produced, nor of heat. In the production of compound gases, where it is necessary to insert different substances in the retort, this is also of much importance. Were the charge simply to be thrown into the chamber c there would be much loss of time and labor, and also much escape of gas. The cylindrical form of the charge-receptacles allows the same to be turned in the chamber c so as to roast the contents thoroughly on all sides.

The condensing-chamber k, by being connected by the pipes, as shown, and being surrounded by cold water, expose a very large condensing-surface, and thus all extraneous moisture will be condensed from the gas and may be drawn off.

What I claim as my invention, and desire to secure by Letters Patent, is—

1. The combination of the perforated charge cylinder or cylinders d, open at the inner end, and the horizontal close retort cylinder or cylinders c, substantially as and for the purpose herein specified.

2. The condensing-chambers k k, connected by the pipes b b, and provided with discharge-cocks m m, when used in combination with the inclosing water-tank B, substantially as described.

3. The combination and arrangement of the tight barrel q and pipes p r with the pipe n, for the purpose of pumping off the condensed water that gathers without admitting air or allowing escape of gas, substantially as set forth.

In witness whereof I have hereunto signed my name in the presence of two subscribing witnesses.

J. J. ENSLEY.

Witnesses:
R. F. OSGOOD,
EDWARD BRAGGINS.